(12) United States Patent  (10) Patent No.: US 9,108,541 B2
Assmann et al.  (45) Date of Patent: Aug. 18, 2015

(54) RECLINER SYSTEM FOR A VEHICLE SEAT

(75) Inventors: Uwe Assmann, Remscheid (DE);
Christoph Peters, Wermelskirchen (DE); Thomas Mayer, Remscheid (DE); Ulrich Lehmann, Alfter (DE); Gunther Hille, Remscheid (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 218 days.

(21) Appl. No.: 13/806,644

(22) PCT Filed: Jun. 7, 2011

(86) PCT No.: PCT/EP2011/002771
§ 371 (c)(1),
(2), (4) Date: Feb. 15, 2013

(87) PCT Pub. No.: WO2011/160771
PCT Pub. Date: Dec. 29, 2011

(65) Prior Publication Data
US 2014/0110984 A1  Apr. 24, 2014

(30) Foreign Application Priority Data

Jun. 22, 2010 (DE) .................... 10 2010 025 112
Nov. 3, 2010 (DE) .................... 10 2010 050 542
Nov. 3, 2010 (DE) .................... 20 2010 015 171 U
Dec. 10, 2010 (DE) .................... 10 2010 054 314

(51) Int. Cl.
*B60N 2/22* (2006.01)
*B60N 2/20* (2006.01)
*B60N 2/235* (2006.01)
*B60N 2/68* (2006.01)

(52) U.S. Cl.
CPC .. *B60N 2/22* (2013.01); *B60N 2/20* (2013.01); *B60N 2/2356* (2013.01); *B60N 2/682* (2013.01); *B60N 2205/50* (2013.01)

(58) Field of Classification Search
CPC ............ B60N 2/20; B60N 2/22; B60N 2/682; B60N 2/2356
USPC .......................... 297/363, 367 P, 367 R, 463.1
See application file for complete search history.

(56) References Cited

U.S. PATENT DOCUMENTS 5,749,626 A * 5/1998 Yoshida .................... 297/367 R
5,881,854 A * 3/1999 Rougnon-Glasson .... 297/367 R
(Continued)

FOREIGN PATENT DOCUMENTS

CN 1457306 A 11/2003
CN 101277843 A 10/2008
(Continued)

OTHER PUBLICATIONS

International Search Report received in connection with PCT/EP2011/002771 dtd Oct. 12, 2011.
(Continued)

*Primary Examiner* — Anthony D Barfield
(74) *Attorney, Agent, or Firm* — Foley & Lardner LLP

(57) ABSTRACT

For a recliner system for a vehicle seat, in particular a motor vehicle seat, comprising at least one recliner, which has a first recliner part and a second recliner part, which can be locked to each other and can be rotated relative to each other about an axis, a transfer rod, the rotation of which unlocks the recliner, and a hand lever, the operation of which rotates the transfer rod in order to unlock the recliner, a stop module is provided, which is operatively connected to the hand lever and to the transfer rod and which stops the hand lever and one of the recliner parts relative to each other in at least one rotational direction.

14 Claims, 13 Drawing Sheets

(56) References Cited

U.S. PATENT DOCUMENTS

Figure 2:
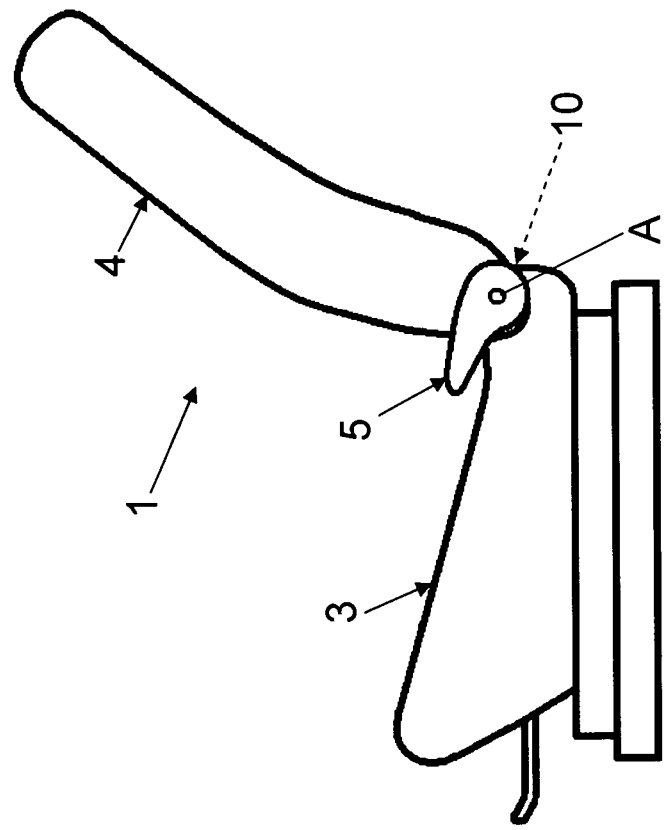

| | | | |
|---|---|---|---|
| 6,454,354 B1 * | 9/2002 | Vossmann et al. | 297/367 R |
| 6,799,806 B2 | 10/2004 | Eppert et al. | |
| 7,182,196 B2 * | 2/2007 | Weber | 297/367 R |
| 7,946,652 B2 * | 5/2011 | Stilleke et al. | 297/367 R |
| 2008/0185892 A1 | 8/2008 | Peters et al. | |
| 2010/0072802 A1 | 3/2010 | Smith et al. | |

FOREIGN PATENT DOCUMENTS

| | | |
|---|---|---|
| CN | 101415584 A | 4/2009 |
| DE | 15 54 063 A1 | 11/1969 |
| DE | 103 35 869 A1 | 3/2005 |
| DE | 1020060 15 560 B3 | 8/2007 |
| DE | 1020080 45 349 A1 | 3/2010 |

OTHER PUBLICATIONS

International Preliminary Report on Patentability received in connection with international application No. PCT/EP2011/002771; dtd Dec. 28, 2012.

First Office Action issued in corresponding Chinese Application No. 201180006671.3 dated Mar. 20, 2014 along with an English translation.

* cited by examiner

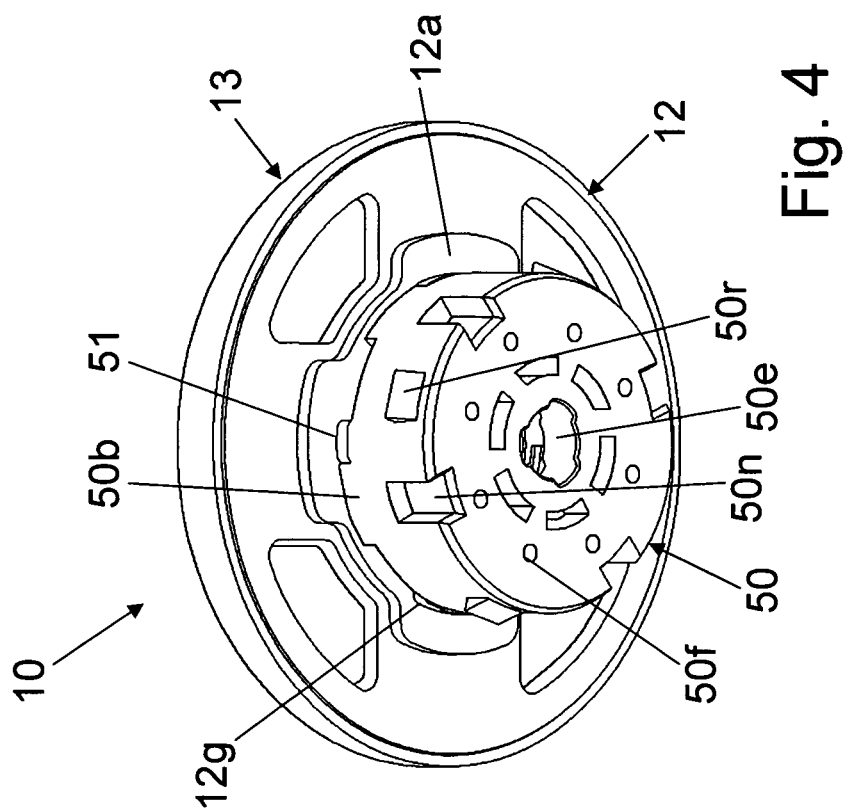
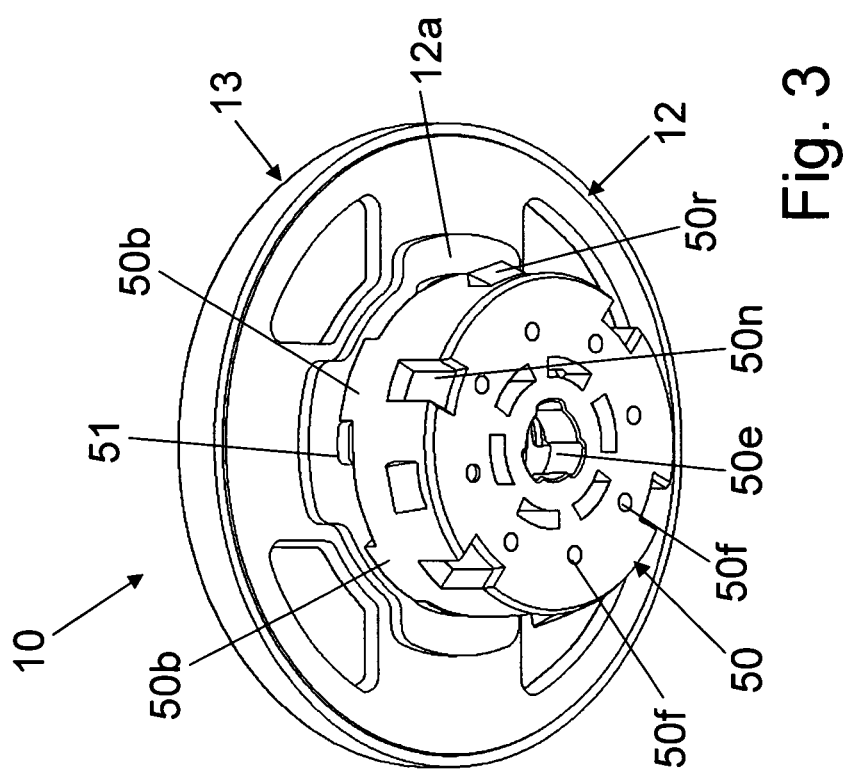

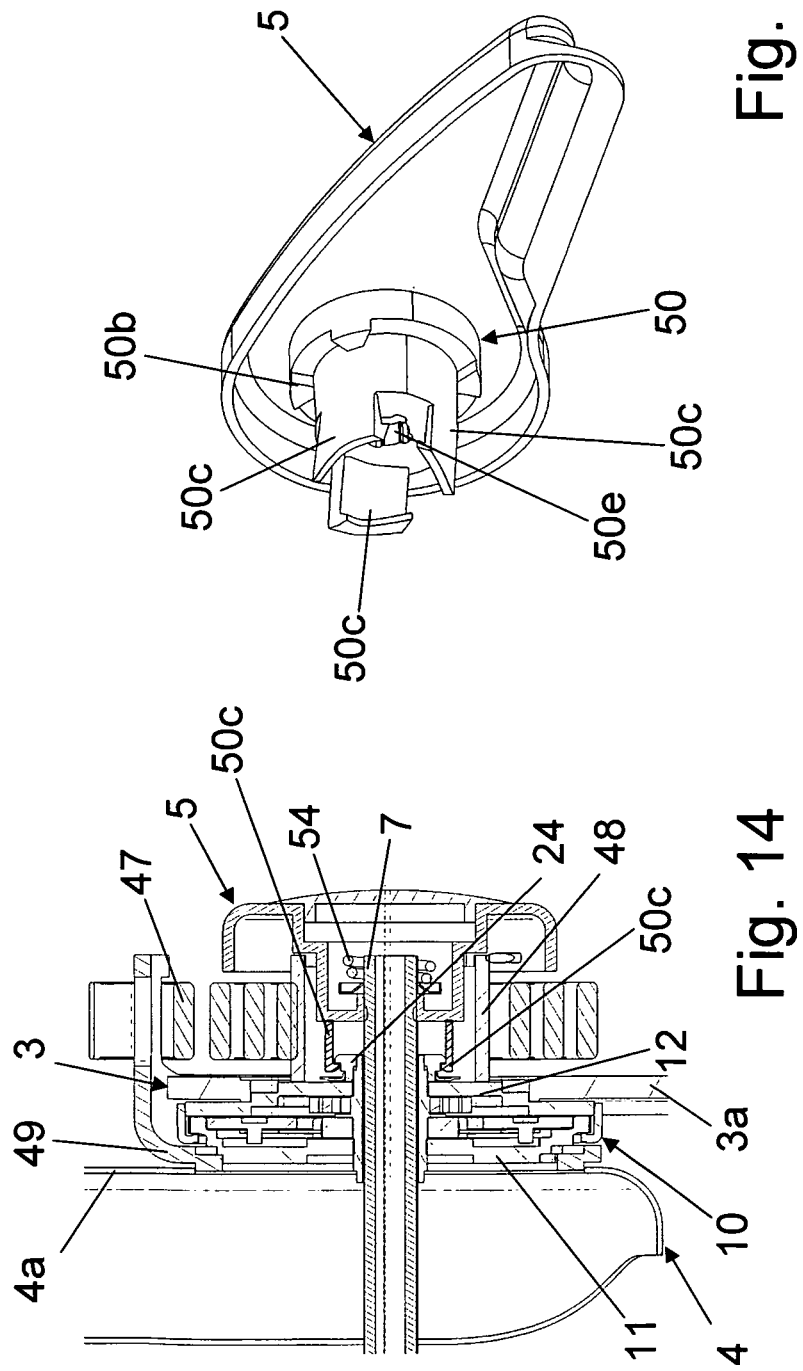

RECLINER SYSTEM FOR A VEHICLE SEAT

CROSS REFERENCE TO RELATED APPLICATIONS

The present application is a National Stage of International Application No. PCT/EP2011/002771 filed on Jun. 7, 2011, which claims the benefit of German Patent Application No. 10 2010 025 112.7 filed on Jun. 22, 2010, German Patent Application No. 10 2010 050 542.0 filed on Nov. 3, 2010, German Patent Application No. 20 2010 015 171.6 filed on Nov. 3, 2010, and German Patent Application No. 10 2010 054 314.4 filed on Dec. 10, 2010, the entire disclosures of all of which are incorporated herein by reference.

The invention relates to a recliner system for a vehicle seat, having the features of the preamble of claim 1.

A recliner system of this kind is known from DE 103 35 869 A1. A special spring imposes a load on the transmission rod in the locking direction to eliminate rattling. In addition, said spring secures the transmission rod against movement in the axial direction.

It is the underlying object of the invention to improve a recliner system of the type stated at the outset. According to the invention, this object is achieved by a recliner system having the features of claim 1. Advantageous embodiments form the subject matter of the dependent claims.

The recliner system according to the invention comprises at least one recliner, a transmission rod, a hand lever, a stop module and, as an option, a backrest compensation spring. The stop module, which is operatively connected to the hand lever, on the one hand, and to the transmission rod, on the other hand, and which brings the hand lever and one of the recliner parts into stop contact relative to one another in at least one direction of rotation, performs several functions.

The first function which is obtained from the operative connection is the transmission of the torque from the hand lever to the transmission rod, which transmits the torque to the recliners when the hand lever is pivoted into the unlocking position. Torque transmission is preferably limited to a defined angular range, and therefore the hand lever can be pivoted only between an initial position and a maximum deflection.

The first function is a precondition for the second function, namely misuse prevention, in which torque transmission is interrupted since the hand lever and one of the recliner parts are brought into stop contact relative to one another and the torque thus impinges on said recliner part, i.e. is ineffective. As a result, the internal components of the recliner are protected. This is important especially for rotation in the locking direction because in that case the internal components of the recliner are already occupying the end position thereof and the imposition of a further load by the transmission rod would lead directly to damage. However, the second function of the stop module as a misuse preventer can also be extended by arranging for the stop module to come into effect also when the recliner is unlocked and the transmission rod is rotated further in the unlocking direction. The stop module then limits the angular range for the actuation of the hand lever.

A third function can be rattle elimination if the stop module is held in stop contact with the recliner by means of a return spring, preventing a relative movement of the transmission rod in operative connection with the stop module (below the preload of the return spring). In order to accommodate the return spring within the structure, the stop module is preferably of cup-shaped design. The definition of the end position of the hand lever can be regarded as a fourth function of the stop module.

For the first function, which is effective in the circumferential direction, torsionally rigid connections are preferably provided between the hand lever and the stop module and between the stop module and the transmission rod, e.g. appropriately profiled receptacles, openings, ribs or grooves. For the second function, which is likewise effective in the circumferential direction, the stops and counterstops are preferably designed to project axially with an appropriate extent in the radial direction in order to form large stop surfaces in the circumferential direction. The counterstops are preferably formed on the associated recliner part, i.e. formed integrally therewith but, as an alternative, can also be produced separately and fixed on the recliner part.

Latching noses and latching openings and/or clip hooks and rings or annular beads can be provided for axial retention between the hand lever and the stop module and between the stop module and the other components of the recliner. There can be torsionally rigid connections and axial retention arrangements throughout between various elements of the operative connection. For example, a suitable option for the stop module and the transmission rod, which is profiled in the manner of an extruded section, is to use the next element, namely the driver located within the recliner and to be rotated by the transmission rod, for axial retention by providing said driver with a fastening ring, for example, preferably a fastening ring which is welded on.

The backrest compensation spring is preferably of spiral design and is supported at the inner end thereof on a supporting bush. The supporting bush is preferably placed with the end thereof against one of the recliner parts, in alignment with the axis of the latter, and is welded directly thereto. The term "directly welded on" is to be taken to mean that no further components are provided between the recliner part concerned and the supporting bush. The direct connection is established solely by the melted material of the recliner part and the supporting bush and, if appropriate, a filler material added during welding. For support, the backrest compensation spring can rest by the innermost turn thereof on the supporting bush and can be hooked in by means of the end thereof. The supporting bush preferably has a (circular) ring-shaped end, which can be interrupted along the circumference thereof. The supporting bush is also preferably hollow and open at both ends. The ring shape of the end allows laser welding within the supporting bush along the circular joint between the supporting bush and the recliner part. For MAG welding, a supporting bush having a cup shape open at one end can be advantageous, in which case the bottom of the cup is welded to the recliner part. The counterstops, which are provided for the purpose of limiting the angular range of the pivoting movement of the hand lever and for the second function of the stop module, can be formed on the supporting bush.

The recliner system according to the invention is used in vehicle seats, preferably for adjusting the slope of the backrest, but can also be used at other points. The embodiment of the recliner as a disk-shaped unit makes it possible to achieve any desired variations in angle between the recliner parts through relative rotation about the axis. The axial cohesion of the recliner parts is produced by a clasp ring, which fits over the first recliner part, which can move relative to it, by means of an edge that is bent radially inward, and which is firmly connected to the second recliner part.

Figure 1:
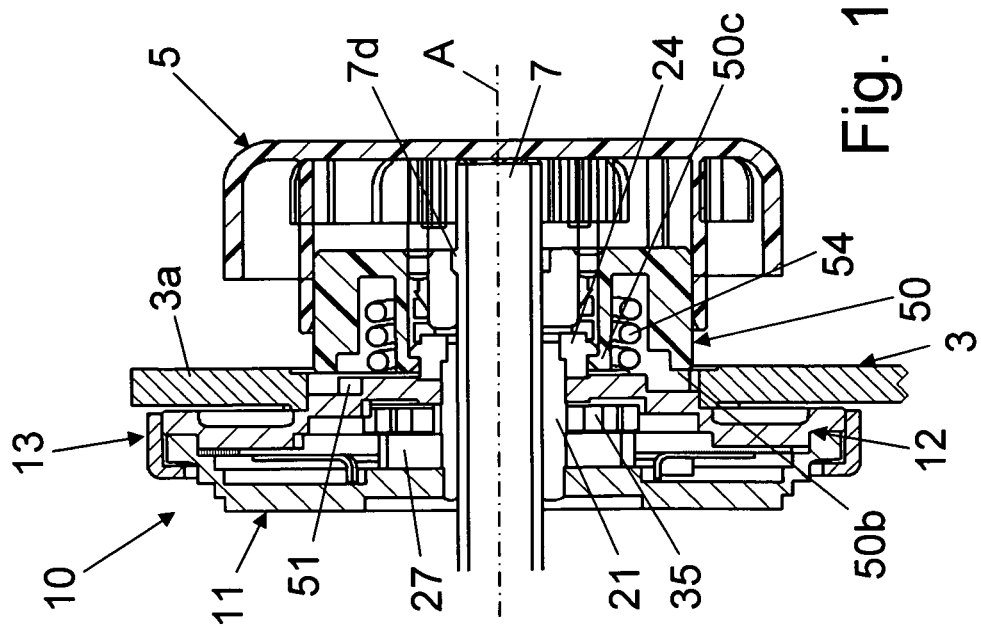
Figure 5:
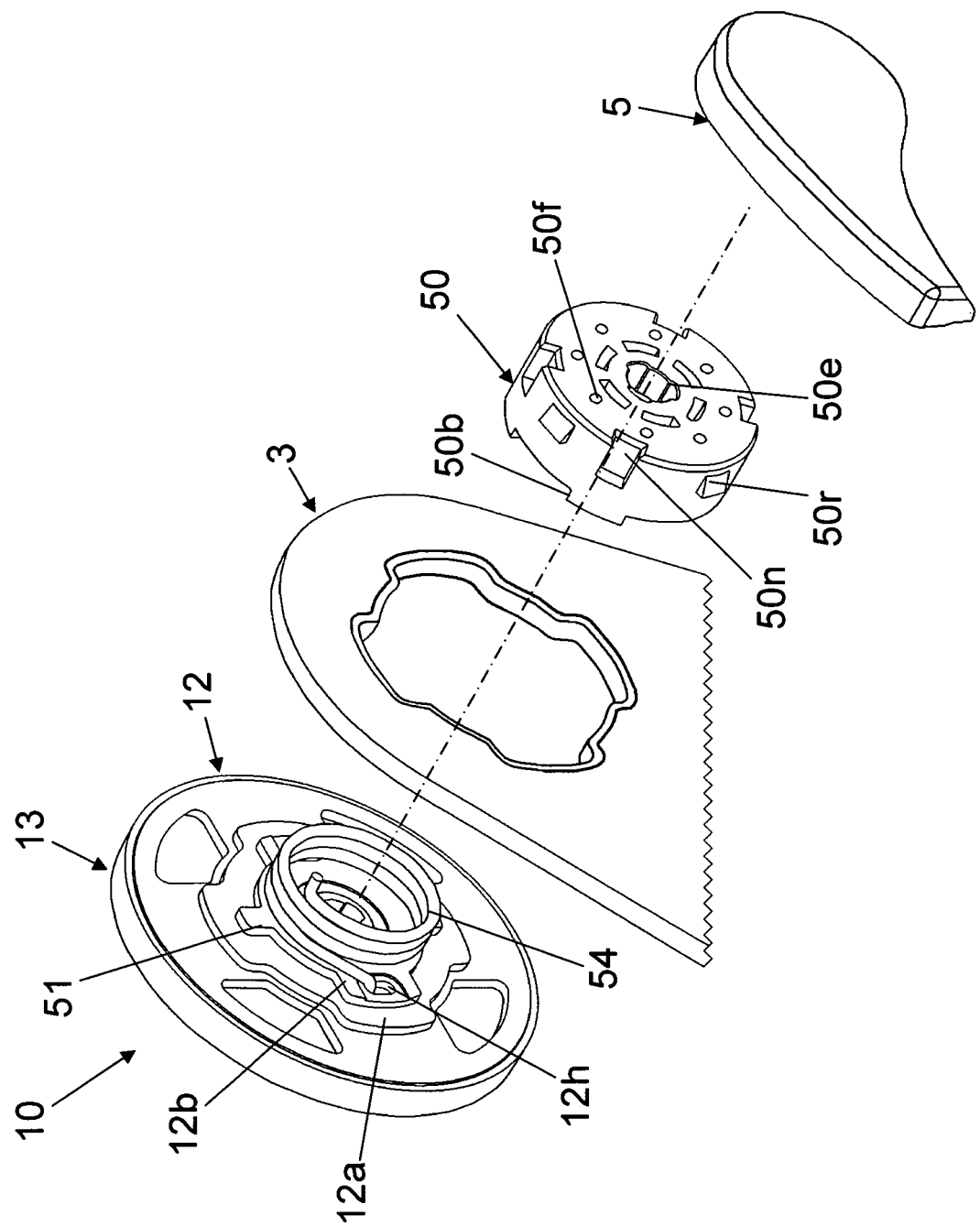
Figure 8:
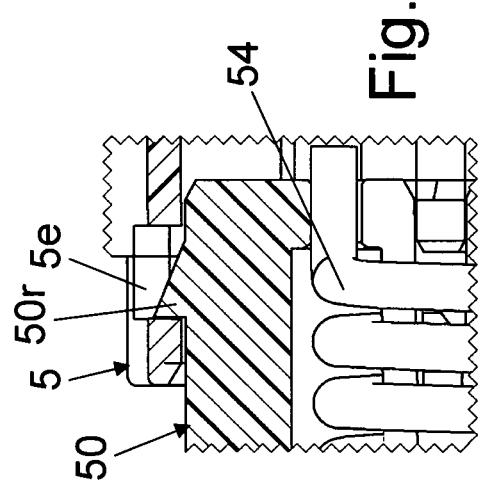
Figure 9:
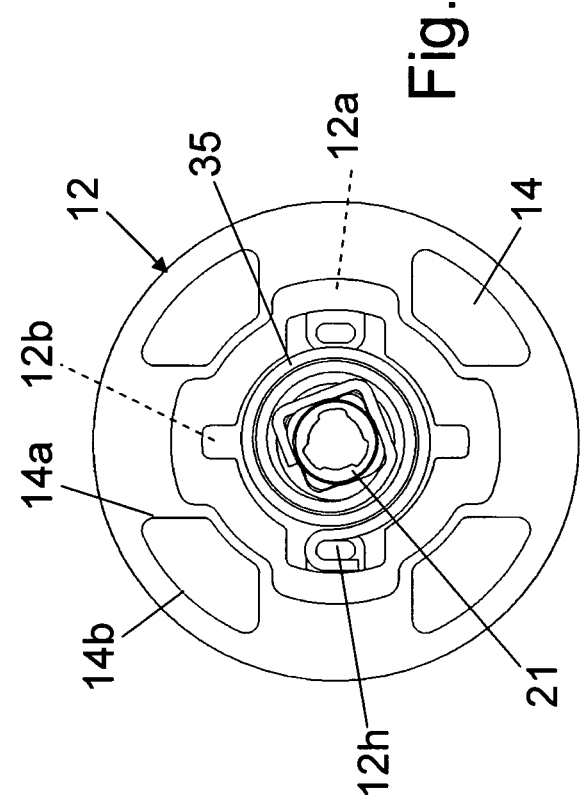
Figure 6:
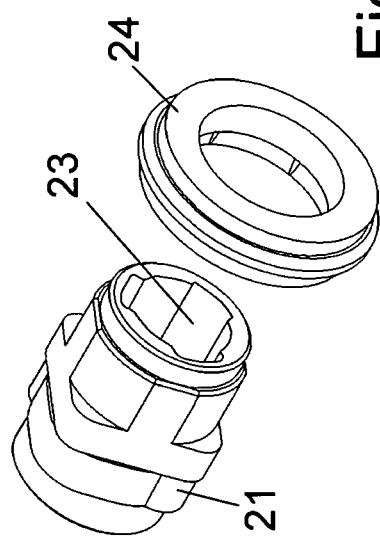
Figure 7:
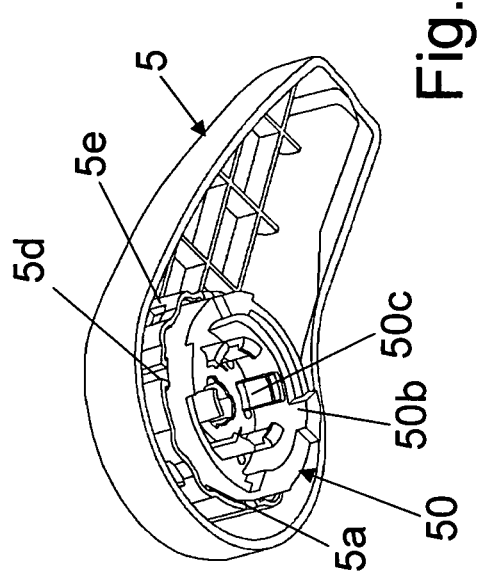
Figure 10:
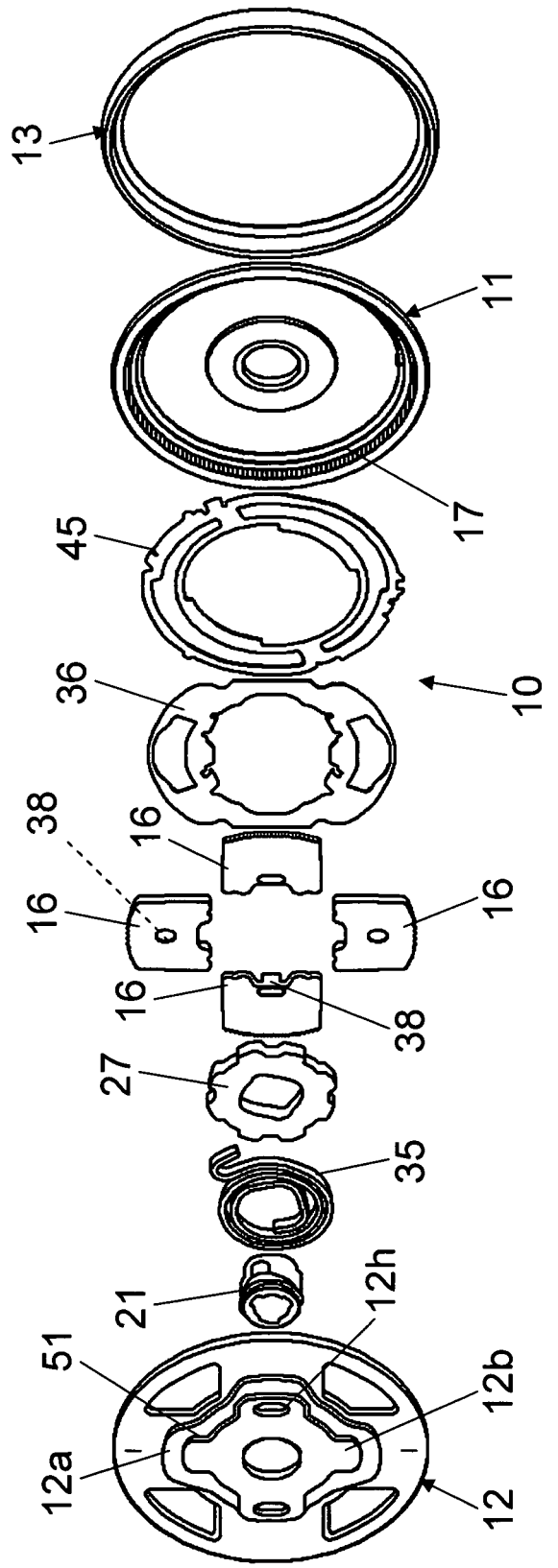
Figure 12:
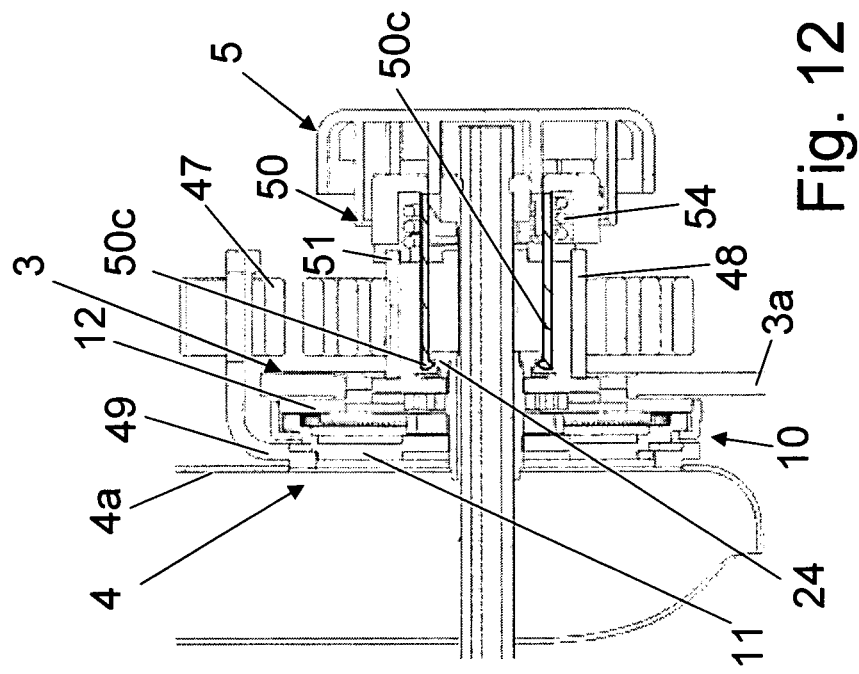
Figure 11:
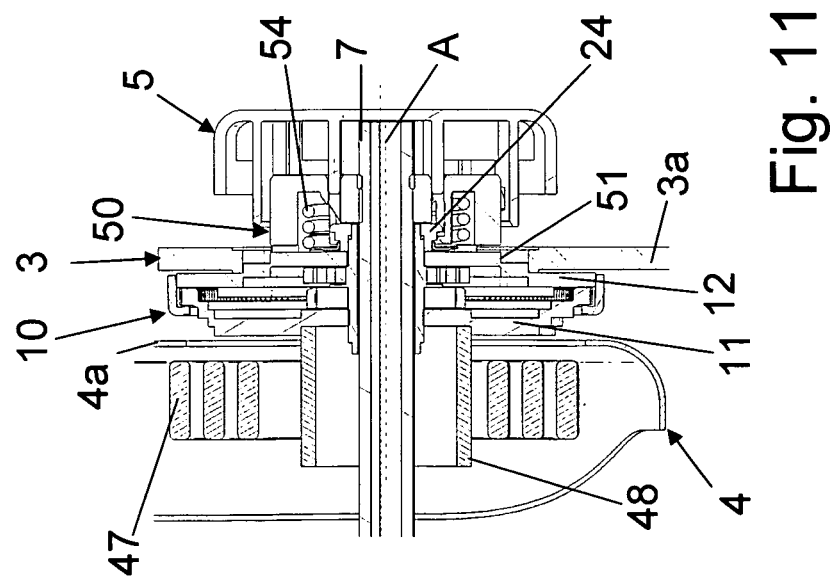
Figure 13:
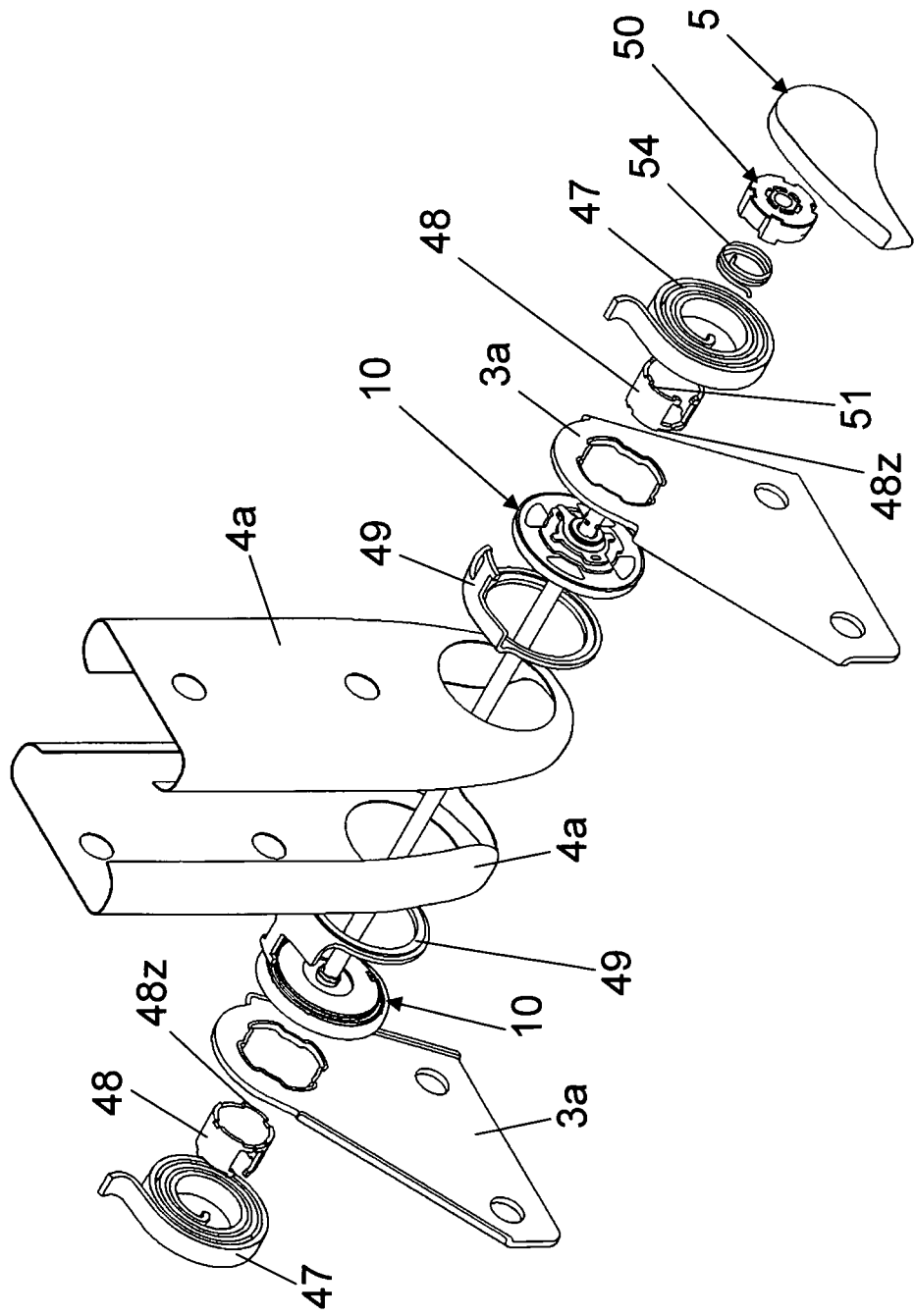
Figure 16:
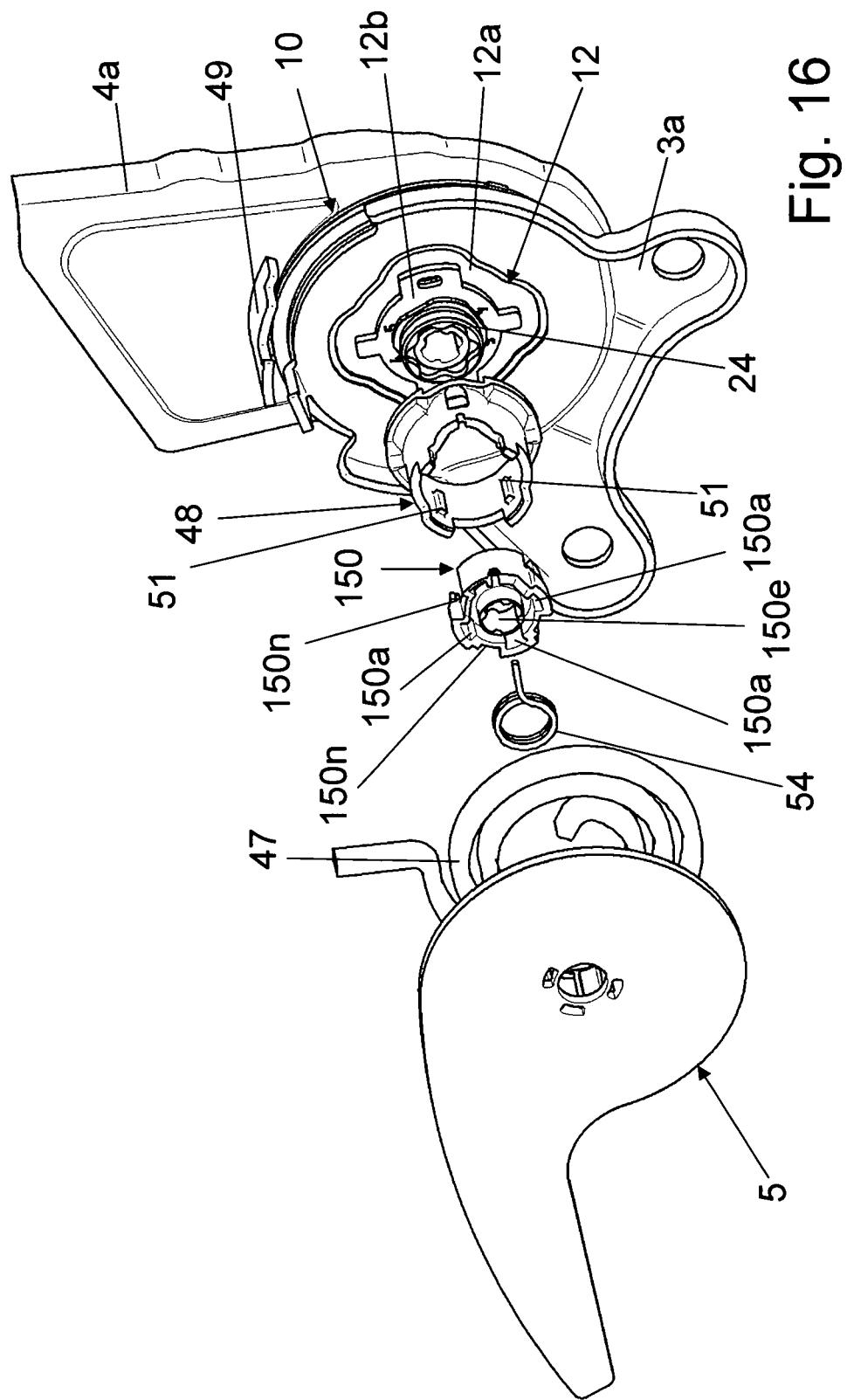
Figure 17:
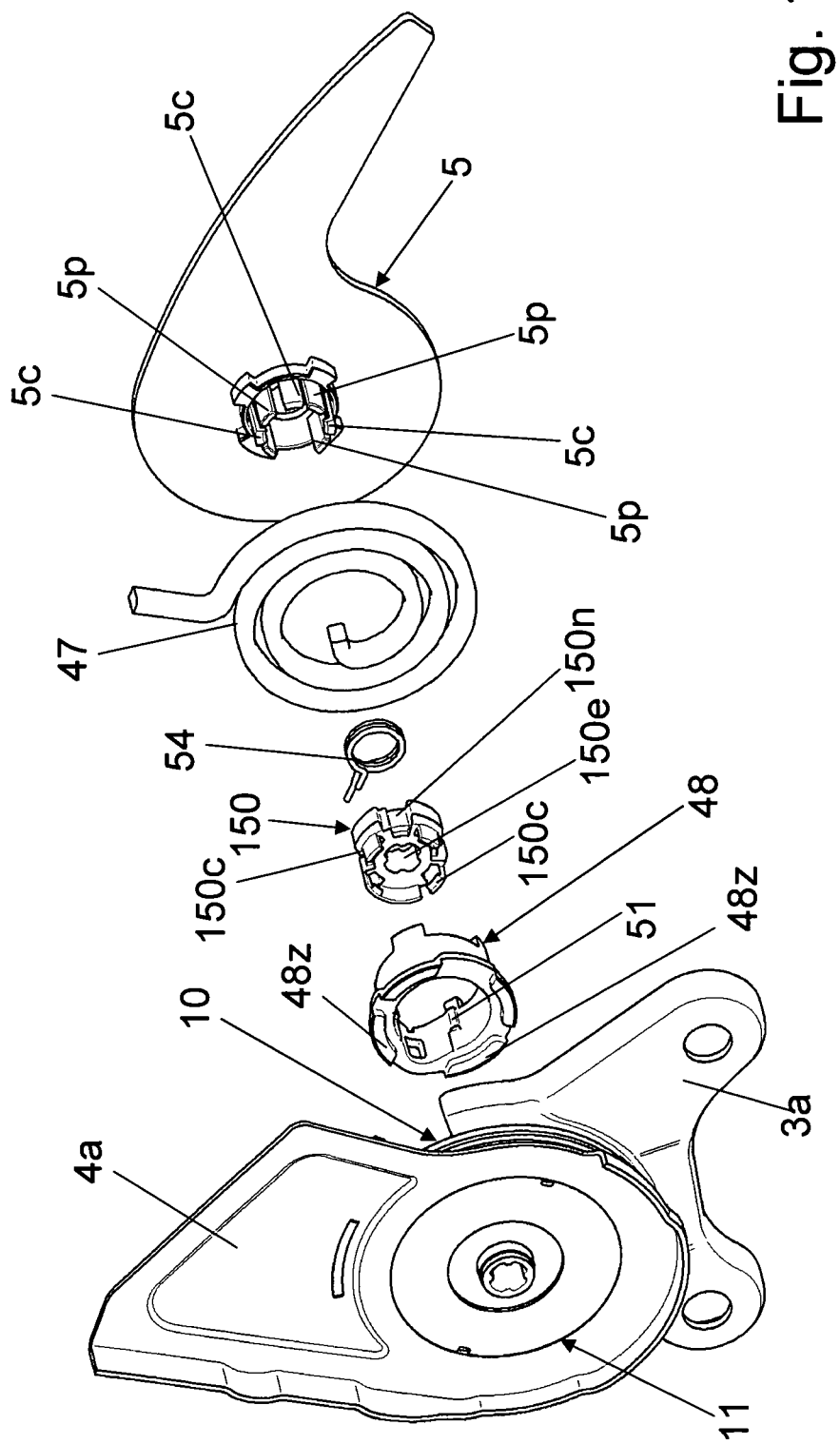
Figure 19:
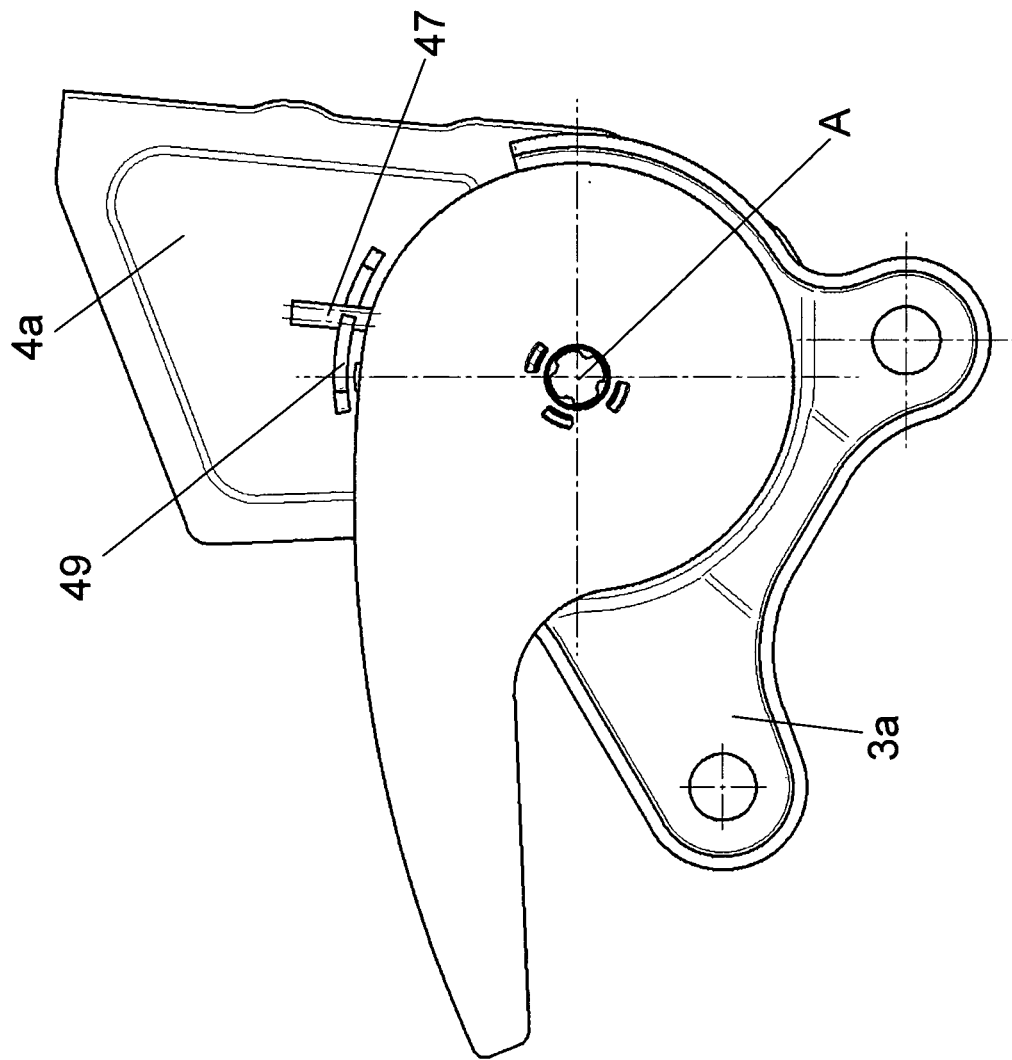
Figure 18:
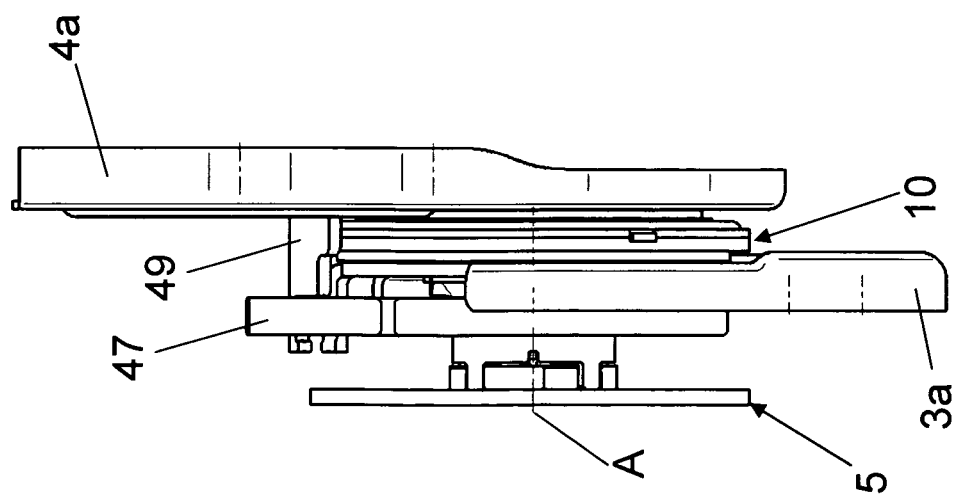
Figure 21:
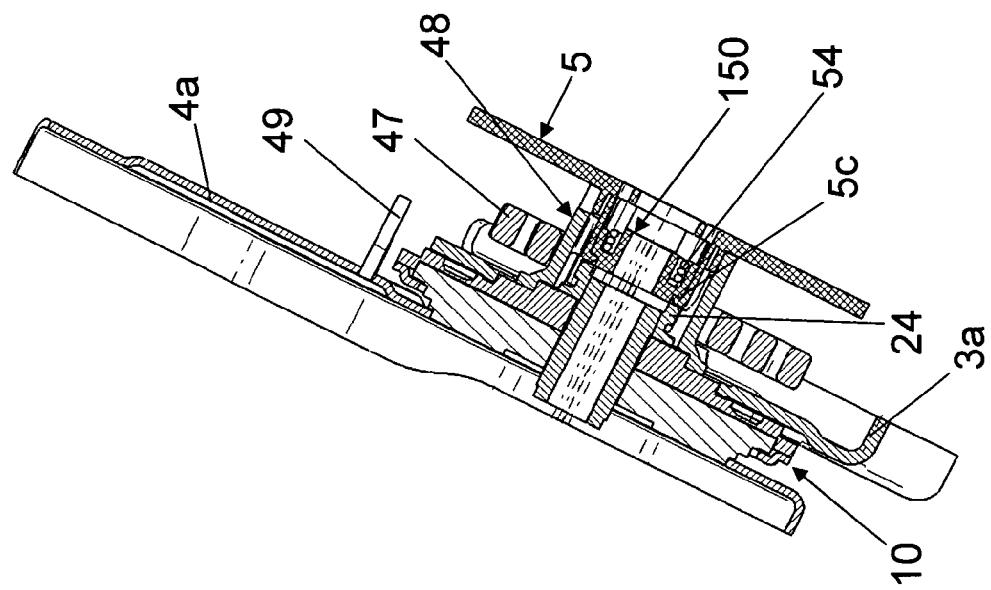
Figure 20:
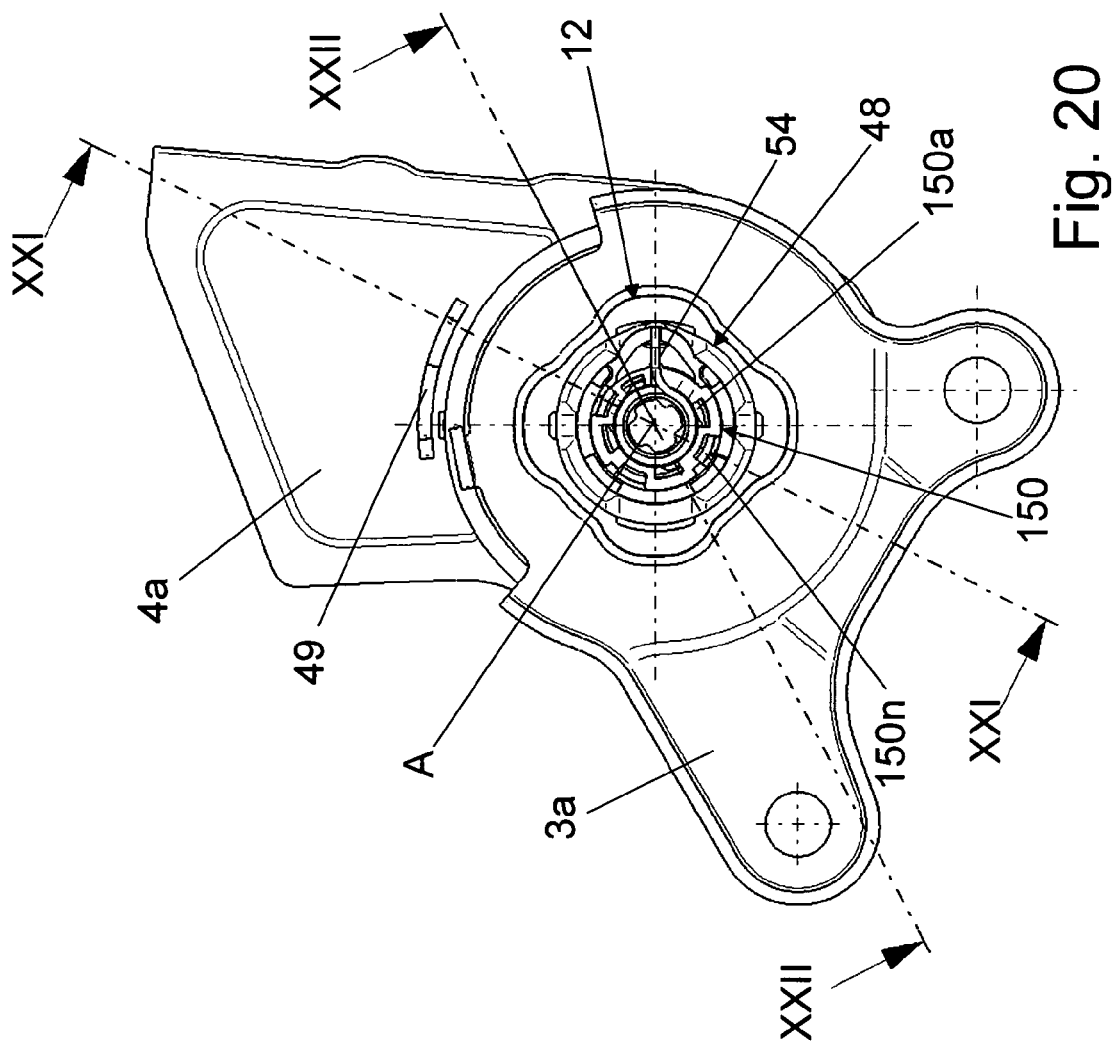
Figure 22:
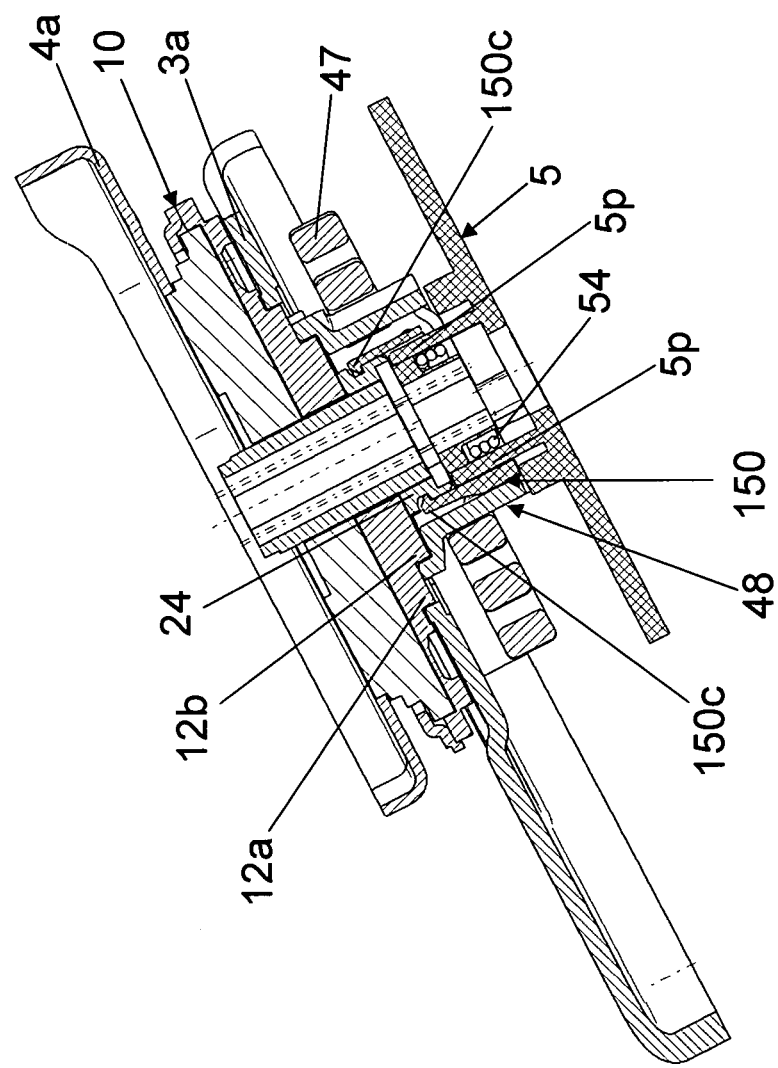

The invention is explained in greater detail below with reference to two embodiments illustrated in the drawing, together with variants and modifications. In the drawing:

FIG. 1 shows an axial section through the recliner, the stop module and the hand lever in accordance with the first embodiment, FIG. 2 shows a schematic representation of a vehicle seat, FIG. 3 shows a perspective view of the stop module and the recliner in the locked state, FIG. 4 shows a view corresponding to FIG. 3 with the stop module rotated (unlocked state), FIG. 5 shows an exploded view of the recliner, the stop module, the hand lever and part of the seat part, FIG. 6 shows a perspective representation of the driver and the driver ring, FIG. 7 shows a perspective representation of the hand lever and the stop module, FIG. 8 shows an axial section through part of the hand lever and the stop module, FIG. 9 shows a view of the second recliner part together with the spring arrangement and the driver, FIG. 10 shows an exploded representation of a recliner, FIG. 11 shows an axial section through the recliner, the stop module, the hand lever and a backrest compensation spring supported in accordance with a first variant, FIG. 12 shows an axial section through the recliner, the stop module, the hand lever and a backrest compensation spring supported in accordance with a second variant, FIG. 13 shows an exploded representation of the recliner system including parts of the backrest and of the seat part and two backrest compensation springs supported in accordance with the second variant, FIG. 14 shows an axial section through the recliner, the backrest compensation spring and a hand lever formed integrally with the stop module, FIG. 15 shows a perspective view of the hand lever, which is formed integrally with the stop module, FIG. 16 shows an exploded representation of the recliner system part arranged on the left-hand side of the vehicle seat, in accordance with the second embodiment, FIG. 17 shows an exploded representation from a different direction to that in FIG. 16, FIG. 18 shows a rear view corresponding to FIG. 16, FIG. 19 shows a side view corresponding to FIG. 16, FIG. 20 shows a side view corresponding to FIG. 19, without the hand lever, FIG. 21 shows a section along the line XXI-XXI in FIG. 20 with a schematically illustrated recliner, and FIG. 22 shows a section along the line XXII-XXII in FIG. 20 with a schematically illustrated recliner.

A vehicle seat 1 for a motor vehicle has a seat part 3 and a backrest 4, the slope of which relative to the seat part 3 can be adjusted. To adjust the slope of the backrest 4, a transmission rod 7, which is arranged horizontally in the transitional area between the seat part 3 and the backrest 4, is rotated manually by means of a hand lever 5, for example. The transmission rod 7 engages in a recliner 10 on both sides of the vehicle seat 1. The transition rod 7 defines the direction indications used, which are those of a cylindrical coordinate system.

The two recliner parts 11 and 12 can each be inscribed approximately in a circular disk shape. The two recliner parts 11 and 12 are produced in a manner which will be described below. To absorb the axially acting forces, i.e. to hold the recliner parts 11 and 12 together, a clasp ring 13 is provided. Such a way of holding the parts together by means of a clasp ring is described in U.S. Pat. No. 6,799,806 B2, for example. The clasp ring 13, which is preferably made of metal, is firmly connected to one of the two recliner parts 11 and 12, e.g. to the second recliner part 12, preferably being welded or—if it fits over the recliner part connected to it—flanged thereto. On one side, the clasp ring 13 has an edge which is bent radially inward and by means of which it fits radially on the outside over the other of the two recliner parts 11 and 12, e.g. the first recliner part 11, if appropriate with a separate slip ring optionally interposed, without hindering the relative movement of the two recliner parts 11 and 12. In terms of construction, therefore, the two recliner parts 11 and 12 together (with the clasp ring 13) form a disk-shaped unit.

After the mounting of the recliner 10, the first recliner part 11 is firmly connected to the structure of the backrest 4, for example, in the present case a backrest part 4a, i.e. is fixed to the backrest. The second recliner part 12 is then firmly connected to the structure of the seat part 3, in the present case to a seat part adapter 3a, i.e. is fixed to the seat part. However, the associations of the recliner parts 11 and 12 can also be swapped around, i.e. the first recliner part 11 would then be fixed to the seat part and the second recliner part 12 would be fixed to the backrest.

The recliner 10 is designed as a detent recliner, on which a first recliner part 11 and a second recliner part 12 can be locked to one another and, after being unlocked, can be rotated relative to one another about an axis A (aligned with the transmission rod 7), as described in DE 10 2006 015 560 B3, for example.

The second recliner part 12 has guide segments 14—in the present case four such segments—which guide respective locking elements 16 laterally in the radial direction by means of paired straight guide surfaces 14a. The locking elements 16—of which there is a total of four in the present case—are arranged in such a way as to be offset relative to one another—in the present case by 90° in each case—in an installation space defined between the two recliner parts 11 and 12. The locking elements 16 are provided at the radially outer end thereof with a toothed section, which can engage (enter) a toothed rim 17 of the first recliner part 11, which is designed as an internal gear. When the toothed rim 17 and the locking elements 16 are interacting, the recliner 10 is locked. The guide segments 14 each rest by means of a curved bearing surface 14b against the toothed rim 17 of the first recliner part 11 and, as a result, the two recliner parts 11 and 12 support each other.

As an alternative, the first recliner part 11 is arranged in a depression in the second recliner part 12, and the latter fits over it radially on the outside, with the result that the two recliner parts 11 and 12 support each other. In this case, the radially outer edge region of the first recliner part 11 is arranged with the toothed rim 17 radially between the guide segments 14 and the radially outer edge region of the second recliner part 12 (said edge region serving to provide support for the first recliner part 11). Under high loads, e.g. in the case of a crash, the first recliner part 11 can—after a deformation—come into contact by means of its toothed rim 17 with the bearing surfaces 14n on the guide segments 14 which are closer in the direction of load. This increases the strength of the recliner 10.

Arranged in the center of the recliner 10 is a driver 21, made of plastic for example, which is supported in such a way as to be rotatable on at least one of the two recliner parts 11 and 12, in the present case in both recliner parts 11 and 12, more precisely in a central opening thereof. On both sides of the vehicle seat, the driver 21 is connected in a torsionally rigid manner or at least coupled for driving purposes to the transmission rod 7, which is introduced into a hole 23 in the hollow driver 21. In the axial direction, the driver 21 has a larger diameter at the center than at its two ends, which are supported in the recliner parts 11 and 12, and therefore the two recliner parts 11 and 12 secure the driver 21 axially. At one end of the driver 21, in the present case that at the second recliner part 12, a fastening ring 24 is provided, said ring being made of plastic in the present case and preferably being fixed on the driver 21 by means of ultrasonic welding.

An eccentric 27, which is arranged in the installation space defined between the recliner parts 11 and 12, is seated in a torsionally rigid manner or is at least coupled for driving purposes on the driver 21. A spring arrangement 35, in the present case a spiral spring, is arranged in a central receptacle of one of the two recliner parts 11 and 12, in the present case of the second recliner part 12, and, in the present case, is supported on the outside. The spring arrangement 35 imposes a load on the eccentric 27, in the present case by virtue of the fact that it is seated in a torsionally rigid manner on the driver 21 on the inside. An alternative spring arrangement 35 having two spiral springs nested one inside the other is described in DE 10 2005 046 807 B3, for example. The eccentric 27 loaded by the spring arrangement 35 acts on the radially movable locking elements 16 and imposes a load thereon, with the result that they are pushed radially outward so as to enter the toothed rim 17, thus locking the recliner 10.

A control disk 36 is arranged in the installation space axially between the locking elements 16 and the first recliner part 11 and is seated on the eccentric 27, in the present case in a torsionally rigid manner. The control disk 36 has control tracks—in the present case four such tracks—each of which interacts with a nose 38 on each locking element 16. The noses 38 project in an axial direction from the locking elements 16 associated therewith. When there is a rotation (of a few degrees) of the driver 21—and of the eccentric 27, which is thus driven, and of the control disk 36—against to the force of the spring arrangement 35, the control disk 36 pulls the locking elements 16 radially inward, i.e. out of the toothed rim 17, with the result that the recliner 10 is unlocked and the two recliner parts 11 and 12 can be rotated relative to one another about the axis A. It is thereby possible to adjust the slope of the backrest 4 between a number of positions of use suitable for the use of the seat.

In the case of motor vehicles with two doors, the intention is to facilitate access to a rear row of seats by pivoting the backrest 4 free, for which purpose the unlocked backrest 4 is pivoted forward out of one of the positions of use into a position in which it has been pivoted free, which is not suitable for use of the seat. It increases convenience of operation if the hand lever 5—or some other actuating element—does not have to be held during the entire process of pivoting free and the recliners nevertheless lock only in the position in which the backrest has been pivoted free. For this purpose, a ring-shaped pivot-free control element 45, which is connected in a torsionally rigid manner to the first recliner part 11, is optionally provided in the recliner 10 around the axis A, between the control disk 36 and the first recliner part 11. The pivot-free control element 45 has stop tracks which interact with noses 38 on the locking elements 16, limiting the radially outward movement of the latter or allowing them to engage unhindered. To enable the backrest 4 to be pivoted free over more than the angle between two locking elements 16, the noses 38 on the locking elements 16 are arranged on the locking elements 16 associated therewith alternately at different distances radially outward or radially inward, with the result that adjacent noses 38 interact with different stop tracks. Two different designs of locking elements 16 are thus provided. Details are described in DE 10 2006 015 560 B3.

The two recliners 10, the transmission rod 7 and the hand lever 5 are parts of a recliner system, to which at least one backrest compensation spring 47, which is arranged on one of the two recliners 10, also belongs. It is also possible for a backrest compensation spring 47 to be provided on each of the two recliners 10. The backrest compensation spring 47 is produced from a spring steel band of approximately rectangular cross section and is designed as a spiral spring.

The inner end of the backrest compensation spring is supported on the associated recliner 10. For this purpose, the recliner 10 has a supporting bush 48, which is fixed on one of the two recliner parts 11 or 12 and is aligned with the axis A. The supporting bush 48 is preferably made of metal, in particular steel. Fixing is preferably accomplished by means of laser welding. For this purpose, the supporting bush 48 is placed by means of the ring-shaped end thereof against the recliner part 11 or 12 concerned and is then welded to the latter. The backrest compensation spring 47 then rests by means of the innermost turn thereof on the cylindrical outer side of the supporting bush 48 and is hooked into a slot in the supporting bush 48, for example, by means of its end.

The outer end of the backrest compensation spring 47 is supported on a supporting element 49, and therefore imposes a load on the backrest 4 by virtue of its preload. The supporting element 49 can be an axially projecting pin, an axially protruding tab or an axial projection on a supporting ring, for example. In the present case, the supporting element 49 is fixed on the backrest part 4a, from which it projects axially. The preload is chosen in such a way that the backrest compensation spring 47 at least partially compensates for the weight of the backrest 4 in the possible positions of use of the backrest 4.

There are two possibilities as to where the supporting bush 48 is fixed on the recliner 10. In a first variant, the supporting bush 48 can be fixed on the first recliner part 11, which is fixed to the backrest in the present case. Or, in a modified second variant, the supporting bush 48 is fixed on the second recliner part 12, which is fixed to the seat part in the present case. In the first variant, the pin or supporting ring 49 or the like provided for supporting the outer end of the backrest compensation spring 47 is accordingly connected firmly to the seat part 3, being welded on for example, if the supporting bush 48 is fixed on the first recliner part 11, which is fixed to the backrest. In the second variant, the supporting ring 49 or other support provided for supporting the outer end of the backrest compensation spring 47 is connected firmly to the backrest 4, being welded on for example, if the supporting bush 48 is fixed on the second recliner part 12, which is fixed to the seat part.

On the outside of the second recliner part 12 (i.e. the side facing away from the first recliner part 11), said recliner part has a first star-shaped shoulder 12a, the rays or arms of which, there being four thereof (in the present case), are arranged between the guide segments 14, of which there are four (in the present case). A second star-shaped shoulder 12b of smaller dimensions than the first star-shaped shoulder 12a is arranged on said first star-shaped shoulder 12a. A terrace-like structure, which in the present case is formed by virtue of the stamping of the second recliner part 12, is thus obtained. The first star-shaped shoulder 12a is used for fixing on the structure, in the present case on the seat part adapter 3a fixed to the seat part, this being accomplished by inserting the first star-shaped shoulder 12a into a matching opening in the seat part adapter 3a and connecting it firmly thereto, preferably by laser welding. The second star-shaped shoulder 12b provides installation space for the spring arrangement 35 within the recliner 10 on its reverse side. The second star-shaped shoulder 12b projects through the opening and protrudes axially on the other side of the structure. In the first variant, the outer side of the second recliner part 12 faces away from the supporting bush 48 and hence from the backrest compensation spring 47. In the second variant, the supporting bush 48 is arranged on the second star-shaped shoulder 12b so as to project axially and is connected firmly there to the second recliner part 12, preferably being welded on. The end of the supporting bush 48 which faces the second recliner part 12 can have crenellation-like projections 48z, which interact, preferably positively, with the second star-shaped shoulder 12b and thus pre-position the supporting bush 48.

To this extent, the two embodiments are similar. The various variants of the first embodiment are described below.

A stop module 50 is provided between the hand lever 5 and the recliner 10 adjacent thereto, i.e. on only one side of the vehicle seat. The stop module 50 is of cup-shaped design, preferably being designed as a plastic injection molding. The open side of the stop module 50 faces the second recliner part 12 and is in alignment with the axis A thereof. On the open side of the stop module 50, the edge of the cylindrical wall of the stop module 50 is designed in the manner of a crown inasmuch as a plurality of stops 50b, in the present case four such stops, which are formed thereon (i.e. are formed integrally with the stop module 50) project axially along the edge. A plurality of clip hooks 50c, in the present case six such hooks, project axially from within the stop module 50, being arranged concentrically with the stops 50b. The clip hooks 50c engage behind the fastening ring 24 on the driver 21 in the axial direction, forming a clip-type joint and thereby connecting the stop module 50 rotatably to the recliner 10 (on the outer side thereof).

In the first variant, i.e. when the supporting bush 48 is fixed on the first recliner part 11, the four rays or arms of the second star-shaped shoulder 12b define four counterstops 51, which are suitable for interacting with the stops 50b of the stop module 50 in the circumferential direction. In order to create counterstops 51 which are as large as possible radially, the spring arrangement 35 is wound in an appropriately compact manner. In the second variant, i.e. when the supporting bush 48 is fixed on the second recliner part 12, the free ring-shaped end face of the supporting bush 48 has four axial projections, which define the four counterstops 51, which are suitable for interacting with the stops 50b of the stop module 50 in the circumferential direction.

When the stop module 50 is connected to the driver 21, i.e. in the present case clipped thereto, the four stops 50b are arranged with a large amount of play in the circumferential direction, e.g. 30°, between the counterstops 51. The stops 50b preferably rest by means of the axial ends thereof against the first star-shaped shoulder 12a (or the free end of the supporting bush 48).

A return spring 54 is arranged within the stop module 50, between the edge incorporating the stops 50b and the clip hooks 50c in the radial direction. The return spring 54 is preferably wound in a helix made of spring wire. The two spring ends are bent over and project axially (in opposite directions). On one or preferably on two opposite rays or arms of the second star-shaped shoulder 12b, the second recliner part 12 has a holder 12h, which is designed as a peg projecting into the installation space within the recliner 10, said peg having an outwardly open blind hole on its reverse side. The blind hole can be formed as part of the production process during the formation of the peg. Within the recliner 10, the holder 12h is used for fixing the spring arrangement 35. On the outer side of the second recliner part 12, the holder 12h is used for hooking in (i.e. fixing) one of the two spring ends of the return spring 54.

A central opening 50e is provided in the bottom of the stop module 50, i.e. the (largely) closed end thereof, said opening being designed as a through opening in the axial direction and being arranged concentrically with the cylindrical wall having the stops 50b and with the clip hooks 50c. The profiled central opening 50e accommodates the transmission rod 7 in a torsionally rigid manner. A plurality of spring anchorage points 50f distributed uniformly in the circumferential direction, in the present case eight such spring anchorage points, which are designed so as to pass axially through the bottom of the stop module 50, are arranged concentrically with the central opening 50e. The other of the two spring ends of the return spring 54 is inserted (and hence fixed) in one of said spring anchorage points 50f.

A plurality of grooves 15n, in the present case four such grooves, which extend in the axial direction and, at one end, open into the bottom of the stop module 50, are formed in the cylindrical wall of the stop module 50. In the present case, the grooves 50n are in alignment with the stops 50b. A plurality of latching noses 50r, in the present case four such latching noses, are formed on the cylindrical wall of the stop module 50, between the grooves 50n in the circumferential direction. The latching noses 50r have a flank which rises from the direction of the bottom of the stop module 50 and, adjoining said flank, a flank which extends radially inward.

The hand lever 5 is preferably made of plastic and is preferably designed as an integral component. (As a partial area), the hand lever 5 has a receptacle 5a, into which the stop module 50 is introduced (in the axial direction) as the hand lever 5 is mounted. The receptacle 5a then accommodates the majority of the stop module 50. The receptacle 5a is delimited by a wall, on which a plurality of ribs 5d, in the present case four such ribs, are formed, extending in the axial direction. As the hand lever 5 is mounted on the stop module 50, the ribs 5d are introduced (positively) into the grooves 50n. The hand lever 5 and the stop module 50 are thereby connected to one another in a torsionally rigid manner in the circumferential direction, thus allowing transmission of torques. As an option, (further) axial projections are formed on the hand lever 5 and depressions are formed on the stop module 50, e.g. radially between the central opening 50e and the spring anchorage points 50f, and these additionally provide positive engagement between the hand lever 5 and the stop module 50.

A plurality of latching openings 5e, in the present case four such openings, are furthermore formed in the wall of the receptacle 50a, passing through in the radial direction. As the hand lever 5 is mounted on the stop module 50, the latching noses 50r enter the latching openings 5e, thereby forming a clip-type joint, i.e. the leading edge of each latching opening 5e in the direction of mounting engages behind the associated latching nose 50r. The hand lever 5 is thereby secured on the stop module 50 in the axial direction. The resilience of the stop module 50 and of the hand lever 5 are sufficient to ensure that the latching noses 50r can cover the distance between the edge at the end of the wall of the receptacle 5a and the latching opening 50r.

The transmission rod 7 preferably has clamping cams 7d, which project slightly in the radial direction and are formed by a local deformation (squeezing) of the transmission rod 7, for example. The clamping cams 7d interact with the edge of the central opening 50e of the stop module 50 in such a way that they clamp the transmission rod 7 firmly on the stop module 50 in the axial direction, i.e. secure it axially by frictional engagement (and with slight positive engagement), in addition to the torsionally rigid connection in the circumferential direction. The transmission rod 7 is then secured against being pushed into the recliner 10, i.e. into the driver 21. Pushing the transmission rod 7 out of the recliner 10 also hinders the hand lever 5, with which the transmission rod 7 comes into contact in the axial direction.

The stop module 50 is thus in operative connection with the hand lever 5, on the one hand, and with the transmission rod 7, on the other hand, and is generally located in series between these two components. As a first function, the stop module 50 then effects transmission of the torque from the actuated hand lever 5 to the transmission rod 7 (which transmits the torque into the drivers 21 of the two recliners 10) when the hand lever 5 is pivoted in the unlocking direction. The hand lever 5 is pivoted against the force of the return spring 54 and is limited by the contact between the stops 50b and the counterstops 51 located in the unlocking direction.

If the cyclic symmetry of the stop module 50, i.e. especially of the grooves 50n (and accordingly of the ribs 5d of the hand lever 5), and the cyclic symmetry of the transmission rod 7 (and accordingly of the central opening 50e) are relatively prime, there is preferably no direct connection in the circumferential direction between the hand lever 5 and the transmission rod 7 so as to avoid restricting the mounting of the hand lever 5 to a single possibility in the circumferential direction. However, if this is precisely what is wanted, the hand lever 5 can also have a profiled receptacle for the transmission rod 7. As regards the operative connection and the associated function of torque transmission, the stop module 50 would then be in parallel rather than in series between the hand lever 5 and the transmission rod 7.

In at least one direction of rotation, the stop module 50 brings the hand lever 5 and the recliner 10 into stop contact relative to one another. As a second function, the stop module 50 serves as a misuse preventer. If an attempt is made to pivot the hand lever 5 counter to the unlocking direction, i.e. in the locking direction, when the recliners 10 are locked, the contact between the stops 50b and the counterstops 51 prevents the stop module 50—and hence also the transmission rod 7—from rotating.

As an optional third function, the stop module 50 performs a rattle elimination function. In the locked state of the two recliners 10, the stops 50b of the stop module 50 are held in contact with the counterstops 51 of the second recliner part 12, which are located in the locking direction, by means of the return spring 54. The transmission rod 7 is thereby held fast up to a force corresponding to the preload of the return spring 54, and this prevents rattling, at least in the case of slight shocks. If the rattle elimination measures for the transmission rod 7 are to remain effective also in the case of larger shocks, a correspondingly strong return spring 54 should be chosen and a corresponding preload imposed. The stop module 50 with the return spring 54 brings the hand lever 5 into a defined end position, and this can be regarded as a fourth function. The return spring 54 can furthermore also be used for mass compensation of the hand lever 5 in the event of a crash, ensuring that the inertia of the hand lever 5 does not lead to unlocking of the recliner 10.

In a modified embodiment, which is compatible with both variants for the fixing of the supporting bush 48 for the backrest compensation spring 47, the hand lever 5 and the stop module 50 are formed integrally with one another. The receptacle 5a, the ribs 5d, the grooves 5n, the latching opening 5e and the latching noses 50r are accordingly omitted.

The second embodiment is described below. Reference signs which are the same as those in the first embodiment denote components which are the same or have the same action.

A stop module 150, which is preferably made of plastic and preferably has an approximately hollow-cylindrical basic shape, is arranged within the supporting bush 48, between the hand lever 5 and the recliner 10 adjacent thereto, i.e. on only one side of the vehicle seat. On its outer circumferential side, the stop module 150 has radially stepped grooves 150n, which guide clip hooks 5c of the hand lever 5 in the inner step.

The walls of the outer step of the grooves 150n serve as stops 150b of the stop module 150. On its inner circumferential side, the supporting bush 48 has ribs, which are arranged offset relative to one another in the circumferential direction and each extend in the axial direction. The ribs serve as counterstops 51. In the outer step, the grooves 150n accommodate the counterstops 51, with a spacing in the circumferential direction. The spacing between the stops 150b and the counterstops 51 defines the angular range within which the stop module 150 can be rotated relative to the supporting bush 48.

The hand lever 5 is preferably made of plastic and is preferably designed as an integral component. Apart from the clip hooks 5c, the hand lever 5 also has projections 5p, which project axially in parallel with said hooks and of which at least some engage positively in matching receptacles 150a of the stop module 150 and some rest against the inner wall of the supporting bush 48. The projections 5p are used to introduce a driving torque into the stop module 150. A return spring 54, which has two radially projecting legs, is arranged axially between the stop module 150 and the hand lever 5, in a depression in the stop module 150. A shorter leg rests in a notch in the stop module 150, while a longer leg projects radially beyond the stop module 150 and rests in a notch in the supporting bush 48. In positions offset in the circumferential direction with respect to the clip hooks 5c of the hand lever 5, the stop module 150 has additional clip hooks 150c. The stop module 150 is clipped firmly on the fastening ring 24 of the driver 21 by means of its clip hooks 150c, more specifically in such a way as to be secured axially and to be rotatable relative to the driver 21 in the circumferential direction. The hand lever 5 is clipped firmly (rotatably) on the stop module 150 or likewise on the fastening ring 24 by means of its clip hooks 5c. Firmly clipping the hand lever 5 ensures that the return spring 54 is enclosed in a captive manner, and thus only the leg interacting with the supporting bush 48 protrudes.

The profiled transmission rod 7 engages positively in a central opening 150e of matching profile in the stop module 150 and is coupled to the driver 21 for driving purposes. The transmission rod 7 can be secured axially by means of clamping cams which project slightly in the radial direction, which are formed by local deformation (squeezing) of the transmission rod 7, for example, and interact by frictional engagement (and with slight positive engagement) with the wall of the central opening 150e (and if appropriate with the hole 23).

The stop module 150 is thus in operative connection with the hand lever 5, on the one hand, and with the transmission rod 7, on the other hand, and is located in series between these two components (in respect of torque transmission). As a first function, the stop module 150 then effects torque transmission (over a limited angle) from the actuated hand lever 5 to the transmission rod 7 (which transmits the torque to the drivers 21 of the two recliners 10) when the hand lever 5 is pivoted in the unlocking direction. The pivoting movement of the hand lever 5 takes place against the force of the return spring 54 and is limited by the contact between the stops 150b, i.e. the walls of the grooves 150n which are in the lead in the unlocking direction, and the counterstops 51 of the supporting bush 48, which are located further in the unlocking direction.

The stop module 150 brings about positioning of the hand lever 5 in the initial position thereof without play and in a manner secured against misuse since the return spring 54 brings the stop module 150 into contact with the counterstops 51 of the supporting bush 48, which are located in the locking direction, counter to the unlocking direction, i.e. in the locking direction, by means of its stops 150b, i.e. the walls of the grooves 150n which trail in the unlocking direction, and holds it there. As a second function, the stop module 150 serves as a misuse preventer. Said contact between the stops 150b and the counterstops 51 prevents the transmission rod 7 from being manually rotated further out of the initial position in the locking direction. As a third function, the stop module 150 performs a rattle elimination function. The preload of the return spring 54 eliminates play of the stop module 150, i.e. prevents uncontrolled relative movements involving noise generation.

In a corresponding fashion, the supporting bush 48 has the function, in addition to that of supporting the backrest compensation spring 47, of limiting the pivoting movement of the hand lever 5 and assuring the play-free positioning of the hand lever 5 in the initial position thereof in a manner secured against misuse.

LIST OF REFERENCE SIGNS 1 vehicle seat
3 seat part
3a seat part adapter
4 backrest
4a backrest part
5 hand lever
5a receptacle
5c clip hook
5d rib
5e latching opening
5p projection
7 transmission rod
7d clamping cam
10 recliner
11 first recliner part
12 second recliner part
12a first star-shaped shoulder
12b second star-shaped shoulder
12h holder
13 clasp ring
14 guide segment
14a guide surface
14b bearing surface
16 locking element
17 toothed rim
21 driver
23 hole
24 fastening ring
27 eccentric
35 spring arrangement
36 control disk
38 nose
45 pivot-free control element
47 backrest compensation spring
48 supporting bush
48z crenellation-like projection
49 supporting ring
50, 150 stop module
50b, 150b stop
50c, 150c clip hook
50e, 150e central opening
50f spring anchorage point
50n, 150n groove
50r latching nose
51 counterstop
54 return spring
150a receptacle
A axis

The invention claimed is:

1. A recliner system for a vehicle seat, comprising:
at least one recliner, which has a first recliner part and a second recliner part, which can be locked to one another and can be rotated relative to one another about an axis;
a transmission rod, the rotation of which unlocks the recliner;
a hand lever, the actuation of which rotates the transmission rod in order to unlock the recliner; and
a stop module, which is operatively connected to the hand lever, on the one hand, and to the transmission rod, on the other hand, and which can be rotated relative to one of the recliner parts and brings the hand lever and one of the recliner parts into stop contact relative to one another in at least one direction of rotation,
wherein the stop module has at least one stop, and one of the first and second recliner parts or a part directly fixed on one of the first and second recliner parts has at least one counterstop, said one of the first and second recliner parts being closer to the stop module than the other of the first and second recliner parts.

2. The recliner system as claimed in claim 1, wherein the at least one counterstop interacts in the circumferential direction of the axis with the at least one stop and defines the angular range within which the stop module can be rotated relative to said one of the first and second recliner parts.

3. The recliner system as claimed in claim 2, wherein a return spring is provided, causing the stop and the counterstop to interact in one direction of rotation and, if required, rotating the stop module into an initial position, wherein the return spring is fixed in a spring anchorage point of the stop module, on the one hand, and on a holder of said one of the first and second recliner parts, on the other hand.

4. The recliner system as claimed in claim 1, wherein the stop module is of cup-shaped or hollow-cylindrical design and is designed as a plastic injection molding.

5. The recliner system as claimed in claim 1, wherein the stop module and the transmission rod are connected to one another in a torsionally rigid manner, by virtue of the fact that the profiled transmission rod engages positively in a matching central opening of the stop module.

6. The recliner system as claimed in claim 1, wherein the hand lever and the stop module are connected to one another in a torsionally rigid manner, by means of at least one rib extending in the axial direction and at least one groove receiving the rib or by means of other projections and receptacles and/or by means of clip hooks and grooves.

7. The recliner system as claimed in claim 1 wherein at least one latching nose or clip hook pointing in the radial direction and at least one latching opening receiving the latching nose or at least one groove receiving the clip hook is provided for axial retention between the hand lever and the stop module, or in that the hand lever and the stop module are formed integrally with one another.

8. The recliner system as claimed in claim 1, comprising at least one fastening ring fixed to a driver, behind which a clip hook engages for axial retention between the stop module and the driver of the recliner.

9. The recliner system as claimed in claim 1, comprising a toothed rim formed on the first recliner part, an eccentric, which is supported in such a way as to be rotatable about the axis and which can be subjected to a load by a driver that can be rotated by the transmission rod, and a plurality of locking elements, which, with guidance by the second recliner part, by means of guide segments, in a direction radial with respect to the axis, can be moved radially outward under a load imposed by the eccentric and which, for the purpose of locking the recliner, interact radially on the outside, by means of a toothed section, with the toothed rim of the first recliner.

10. The recliner system as claimed in claim 1, comprising a backrest compensation spring of spiral design, which is supported at the inner end thereof on a supporting bush.

11. The recliner system as claimed in claim 10, wherein the supporting bush is fixed by its end on one of the first and second recliner parts, being welded on by means of laser welding.

12. The recliner system as claimed in claim 11 wherein the supporting bush has the at least one counterstop.

13. The recliner system as claimed in claim 12, wherein the stop module is supported in such a way as to be rotatable within the supporting bush, wherein the at least one stop is formed on the outer circumferential side of the stop module, and the at least one counterstop is formed on the inner circumferential side of the supporting bush.

14. A vehicle seat having a seat part and a backrest, which is attached to the seat part, can be pivoted relative to the latter and can be locked to it in different slope positions by means of a recliner system as claimed in claim 1.

\* \* \* \* \*